(12) United States Patent
Laurösch et al.

(10) Patent No.: US 11,953,644 B2
(45) Date of Patent: Apr. 9, 2024

(54) SWITCH CABINET WITH A SWITCH CABINET DOOR HAVING A DOOR STATUS SENSOR

(71) Applicant: RITTAL GMBH & CO. KG, Herborn (DE)

(72) Inventors: Sven Michael Laurösch, Haiger (DE); Markus Hain, Dillenburg (DE)

(73) Assignee: RITTAL GMBH & CO. KG (DE)

( * ) Notice: Subject to any disclaimer, the term of this patent is extended or adjusted under 35 U.S.C. 154(b) by 183 days.

(21) Appl. No.: 17/767,100

(22) PCT Filed: Aug. 13, 2020

(86) PCT No.: PCT/DE2020/100706
§ 371 (c)(1),
(2) Date: Apr. 7, 2022

(87) PCT Pub. No.: WO2021/069006
PCT Pub. Date: Apr. 15, 2021

(65) Prior Publication Data
US 2022/0390639 A1    Dec. 8, 2022

(30) Foreign Application Priority Data
Oct. 11, 2019   (DE) ...................... 10 2019 127 448.6

(51) Int. Cl.
*G01V 3/08*   (2006.01)
*G01V 8/10*   (2006.01)

(52) U.S. Cl.
CPC .............. *G01V 3/081* (2013.01); *G01V 8/10* (2013.01)

(58) Field of Classification Search
CPC ............. G01V 3/081; G01V 8/10; H02B 1/38
See application file for complete search history.

(56) References Cited

U.S. PATENT DOCUMENTS 5,873,274 A * 2/1999 Sauerland ............. E05B 13/002
70/462
10,550,601 B2 * 2/2020 Baumgarte ........... E05B 47/023
(Continued)

FOREIGN PATENT DOCUMENTS

DE          29507654 U1    9/1996
DE    202010010852 U1   11/2011
(Continued)

OTHER PUBLICATIONS

International Search Report (English and German) and Written Opinion of the ISA (German) issued in PCT/DE2020/100706, dated Nov. 10, 2020; ISA/EP.

(Continued)

*Primary Examiner* — Albert K Wong
(74) *Attorney, Agent, or Firm* — Harness, Dickey & Pierce, P.L.C.

(57) ABSTRACT

The invention relates to a switch cabinet with a switch cabinet door which closes the switch cabinet and has a door lock which can be actuated via a door handle, the switch cabinet door having a door status sensor which has a magnetic field sensor being adapted to distinguish an open state of the switch cabinet door from a closed state of the switch cabinet door by means of a detected magnetic field change, characterized in that at least the magnetic field sensor of the door status sensor is accommodated within the door handle in a region of the door handle which is magnetically permeable to the environment of the switch cabinet.

9 Claims, 4 Drawing Sheets

(56) References Cited

U.S. PATENT DOCUMENTS

Figure 1:
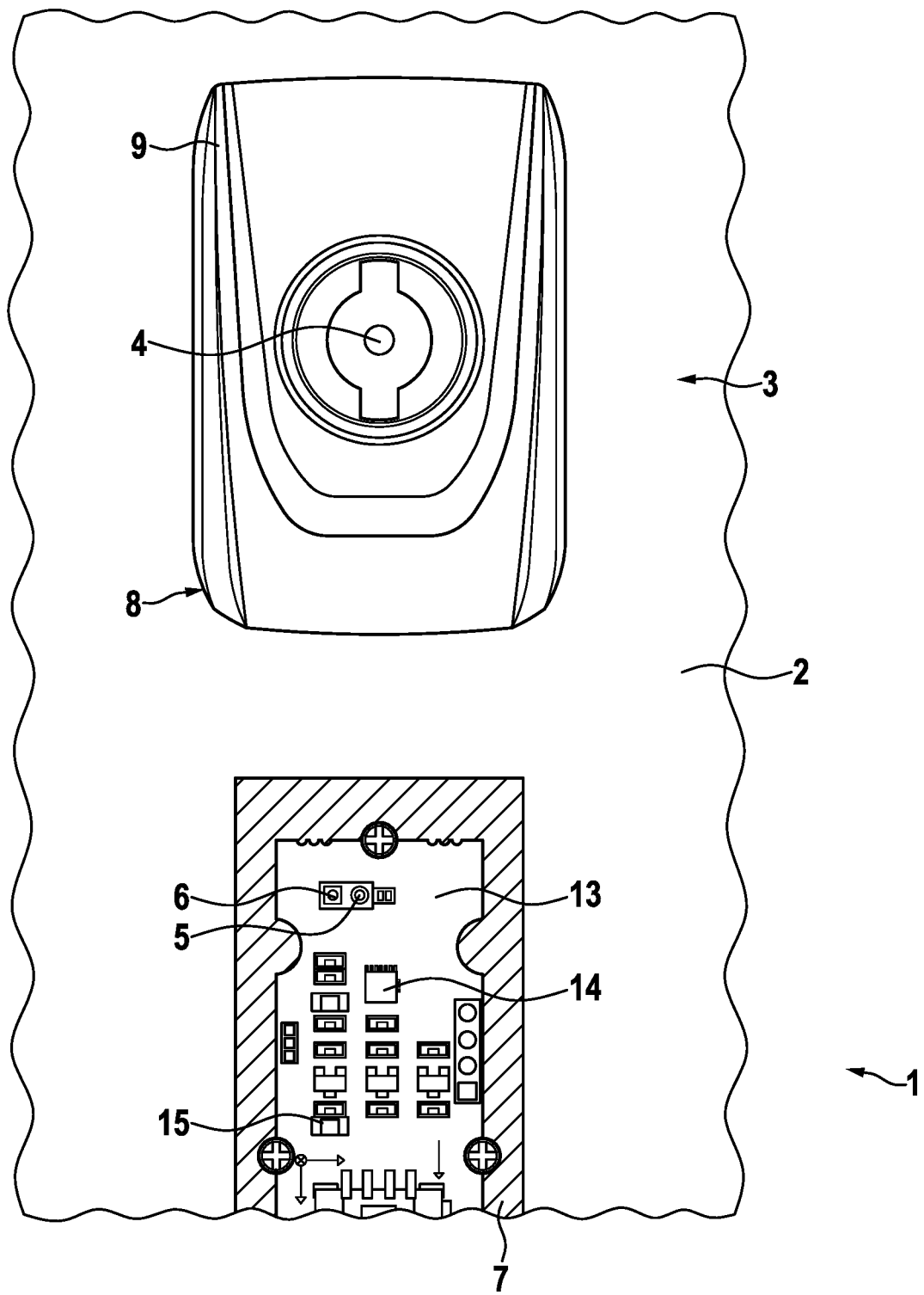

| | | | |
|---|---|---|---|
| 2003/0071739 A1 | 4/2003 | Addy et al. | |
| 2004/0156167 A1* | 8/2004 | Kopke | H02B 1/38 361/647 |
| 2018/0051479 A1 | 2/2018 | Suarez Lainez et al. | |
| 2022/0263295 A1* | 8/2022 | Winkler | H02B 1/32 |
| 2022/0392327 A1* | 12/2022 | Grabowski | G01S 15/62 |

FOREIGN PATENT DOCUMENTS

| | | |
|---|---|---|
| DE | 102012025474 A1 | 7/2014 |
| DE | 102013205368 A1 | 10/2014 |
| DE | 102013220176 A1 | 4/2015 |
| EP | 1900890 A2 | 3/2008 |
| EP | 3091156 A2 | 11/2016 |
| WO | WO-2011141056 A1 | 11/2011 |
| WO | 2016166158 A1 | 10/2016 |

OTHER PUBLICATIONS

German International Preliminary Report on Patentability issued in PCT/DE2020/100706, dated Aug. 25, 2021.

\* cited by examiner

SWITCH CABINET WITH A SWITCH CABINET DOOR HAVING A DOOR STATUS SENSOR

CROSS-REFERENCE TO RELATED APPLICATIONS

This application is a U.S. National Phase Application under 35 U.S.C. 371 of International Application No. PCT/DE2020/100706, filed on Aug. 13, 2020, which claims the benefit of German Patent Application No. 10 2019 127 448.6, filed on Oct. 11, 2019. The entire disclosures of the above applications are incorporated herein by reference.

BACKGROUND

This section provides background information related to the present disclosure which is not necessarily prior art.

Technical Field

The invention is based on a switch cabinet with a switch cabinet door which closes the switch cabinet and has a door lock which can be operated via a door handle, the switch cabinet door having a door status sensor which has a magnetic field sensor and is adapted to distinguish an open state of the switch cabinet door from a closed state of the switch cabinet door via a detected magnetic field change. Monitoring the opening status of a door or window is described, for example, in DE 10 2013 220 176 A1 and DE 10 2013 205 368 A1. Similar sensor arrangements are also known from US 2003/0071739 A1.

Discussion

The transfer of door status sensors known from the prior art using magnetic field sensors to switch cabinets is not possible without further ado. This is due in particular to two factors specific to switch cabinets, firstly the fact that the additional attachment of devices to the outer skin of the switch cabinet, in particular to the switch cabinet door, is undesirable for aesthetic, safety or functional reasons. Secondly, switch cabinets are often made entirely of steel, so that when the magnetic field sensor is attached to and in particular inside the switch cabinet housing, it is not possible to reliably determine a measured magnetic field change in the monitored earth's magnetic field.

SUMMARY

This section provides a general summary of the disclosure, and is not a comprehensive disclosure of its full scope or all of its features.

It is therefore one aspect of the invention to further develop a switch cabinet of the type described at the beginning in such a way that it permits monitoring of the opening state of a switch cabinet door with the aid of a door status sensor having a magnetic field sensor.

Accordingly, it is provided that at least the magnetic field sensor of the door status sensor is accommodated within the door handle of the switch cabinet in a region of the door handle that is magnetically permeable to the environment of the switch cabinet.

By housing the door status sensor inside the door handle, it is achieved that the door status sensor is not visible from the outside on the switch cabinet housing, while it is coupled to the earth's magnetic field via the magnetically permeable area of the door handle to be able to detect a magnetic field change when the switch cabinet door is pivoted from a first opening state to a second opening state, for example from a closed position to an open position.

The door handle may, for example, comprise a ferromagnetic base via which the door handle is placed on an outer side of the switch cabinet door, for example is fastened to the outer side of the switch cabinet door. The door handle may further comprise a cover between which and the base the door status sensor is disposed. In this regard, the cover may comprise the magnetically permeable region and/or be made entirely of a magnetically permeable material.

The door handle can have a door handle body consisting essentially of a ferromagnetic material, in which the door status sensor with the magnetic field sensor is accommodated. The door handle body can have a receptacle which is closed off from the surroundings of the door handle via a magnetically permeable cover and in which at least the magnetic field sensor of the door status sensor or the entire door status sensor is accommodated.

The door handle can have a ferromagnetic swivel lever which can be swiveled with respect to the switch cabinet door and which, in an open position swiveled away from the switch cabinet door, exposes a receptacle of the door handle in which at least the magnetic field sensor of the door status sensor is received and covers the receptacle when the swivel lever is in a closed position swung against the switch cabinet door.

The door handle can be a radio handle for contactless locking and/or unlocking of the door handle. For this purpose, the door handle may have a radio module arranged on a printed circuit board arranged inside the door handle. The door status sensor may be arranged on the same printed circuit board as the radio module.

The door status sensor may further comprise a single-axis or multi-axis acceleration sensor, such as a triaxial acceleration sensor, configured to transition the magnetic field sensor from a standby mode, in which the magnetic field sensor is inactive, to a run mode, in which the magnetic field sensor is activated, to detect a magnetic field change when an acceleration is detected.

The magnetic field sensor can have a reed switch or be designed as such. The switch cabinet can have a permanent magnet or a magnetizable sensor counterpart at a cabinet opening that can be closed by the switch cabinet door. The magnetic field sensor may be remote from the permanent magnet or magnetizable sensor counterpart in an open position of the switch cabinet door, and may be proximate to the permanent magnet or magnetizable sensor counterpart in a closed position of the switch cabinet door.

The magnetic field sensor can have a Hall sensor and the switch cabinet can have a magnetic or a magnetizable sensor counterpart, for example a switch cabinet frame, at a cabinet opening that can be closed by the switch cabinet door.

The switch cabinet can have a light reflector on a cabinet opening that can be closed by the switch cabinet door, and the door status sensor can be a light-sensitive sensor that converts light into electrical energy when light falls on it, for example a photoelement. Alternatively, an IR light barrier can be used.

Insofar as a switch cabinet door is described in the preceding description, this does not necessarily have to be a door hinged on one side to the frame of the switch cabinet in the classical sense, even if this represents the preferred embodiment of the invention. Rather, the invention can also be applied to embodiments in which, for example, another flat part of the switch cabinet is equipped with a door status sensor and a corresponding magnetic field sensor, in order, for example, to determine whether any flat part, for example a mounted side panel of the switch cabinet, has been moved, for which purpose, for example, the side panel would have to be dismantled from the switch cabinet frame, so that, for example, in the case of a detected removed side panel, a de-energized switching of a switchgear system accommodated in the switch cabinet can be initiated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
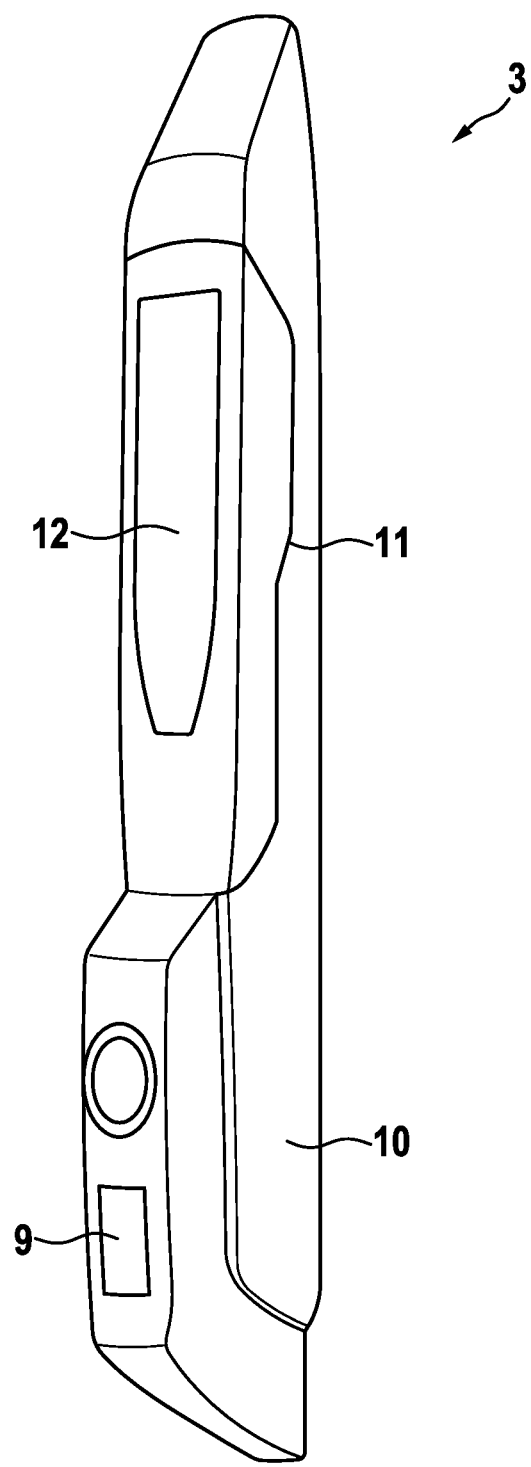
Figure 3:
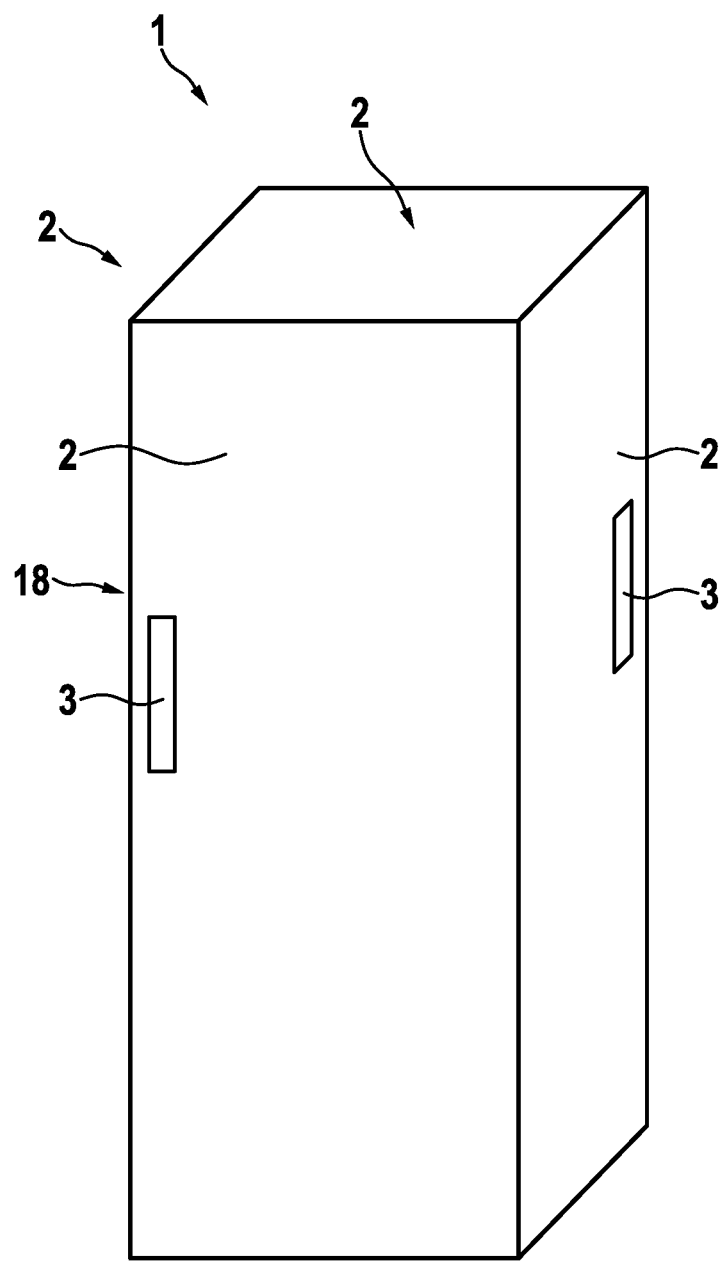

Further details of the invention are explained with reference to the figures below. Thereby shows:

FIG. 1 an exemplary embodiment of a door handle;
FIG. 2 another exemplary embodiment of a door handle;
FIG. 3 a schematic representation of a switch cabinet according to one embodiment of the invention; and
FIG. 4 a detail of a horizontal cross-section in the area of the door handle of the switch cabinet according to FIG. 3.

DETAILED DESCRIPTION

Example embodiments will now be described more fully with reference to the accompanying drawings.

The door handle 3 shown in FIG. 1 is designed as a so-called door lock plate and has a cover 8, which can be mounted on a base 7. A circuit board 13 is arranged on the base 7, which is completely covered by the cover 8 when the cover 8 is mounted on the base 7. The essential electrical functions of the door handle 3 are implemented on the circuit board 13, in particular also the door status sensor 6, in the present case in addition to a radio module 14 and a single-axis or multi-axis acceleration sensor 15. All of the functional assemblies mentioned are implemented on the same circuit board 13 and can thus be accommodated in the interior of the handle 3 in a space-saving manner.

The door handle 3 is made of a plastic material which is magnetically permeable, i.e. has a magnetic permeability in the range of 1. In this way, it is possible for the door status sensor 6 to be installed in a space-saving manner inside the door handle 3 on the one hand, and on the other hand, due to the cover 8 having or forming the permeable area 9, to measure a change in the earth's magnetic field when the door is pivoted from a first position to a second position about a vertical axis, whereby the door status sensor 6 with its magnetic field sensor 5 traverses a circular path. In principle, absolute measurements of the earth's magnetic field, something of a field strength, are not required to perform a door status evaluation in accordance with the invention. For example, during an initial installation of the door handle 3, it can be provided that the door status sensor 6 is calibrated to a closed position of the switch cabinet door 2, so that any deviation of the measured earth magnetic field that exceeds a certain minimum deviation can be evaluated as a door status change, hence an at least partially open position of the switch cabinet door 2.

FIG. 2 shows another embodiment of a door handle 3, which has a pivoted lever 12 that can be pivoted in a plane extending perpendicular to the plane of the cabinet door. The door handle 3 may have a body 10 which, for example, may be made in its essential components of a ferromagnetic material, for example steel or iron, as is usual in generic door handles. Also in this embodiment, the door status sensor 6 (not shown) is accommodated inside the door handle 3, in particular in the lower part of the body 10. In order to avoid magnetic shielding of the sensor 6 inside the corpus 10, the corpus 10 has the magnetically permeable region 9 at its lower end. This can be formed, for example, as a cover made8 of a plastic, for example polycarbonate, and otherwise have the same coloring as the body 10, so that the provision of the permeable area 9 in the lower part of the body 10 does not lead to any aesthetic and functional losses.

Alternatively, in the embodiment according to FIG. 2, the door status sensor 6 can be accommodated in a receptacle 11 of the door handle 3, which is exposed when the pivoted lever 12 is in an open position pivoted away from the switch cabinet door 2, while the receptacle 11 is covered by the pivoted lever 12, which is also ferromagnetic, for example, when the pivoted lever 12 is in a closed position pivoted against the switch cabinet door 2, as shown in FIG. 2.

FIG. 3 shows a schematic representation of a switch cabinet 1 which has a switch cabinet frame 18 on which a plurality of flat parts are arranged, some of which are designed as switch cabinet doors 2 and accordingly have a door handle 3. Furthermore, the switch cabinet 1 has additional flat parts which are not designed as doors, for example side panels or a roof plate.

Figure 4:
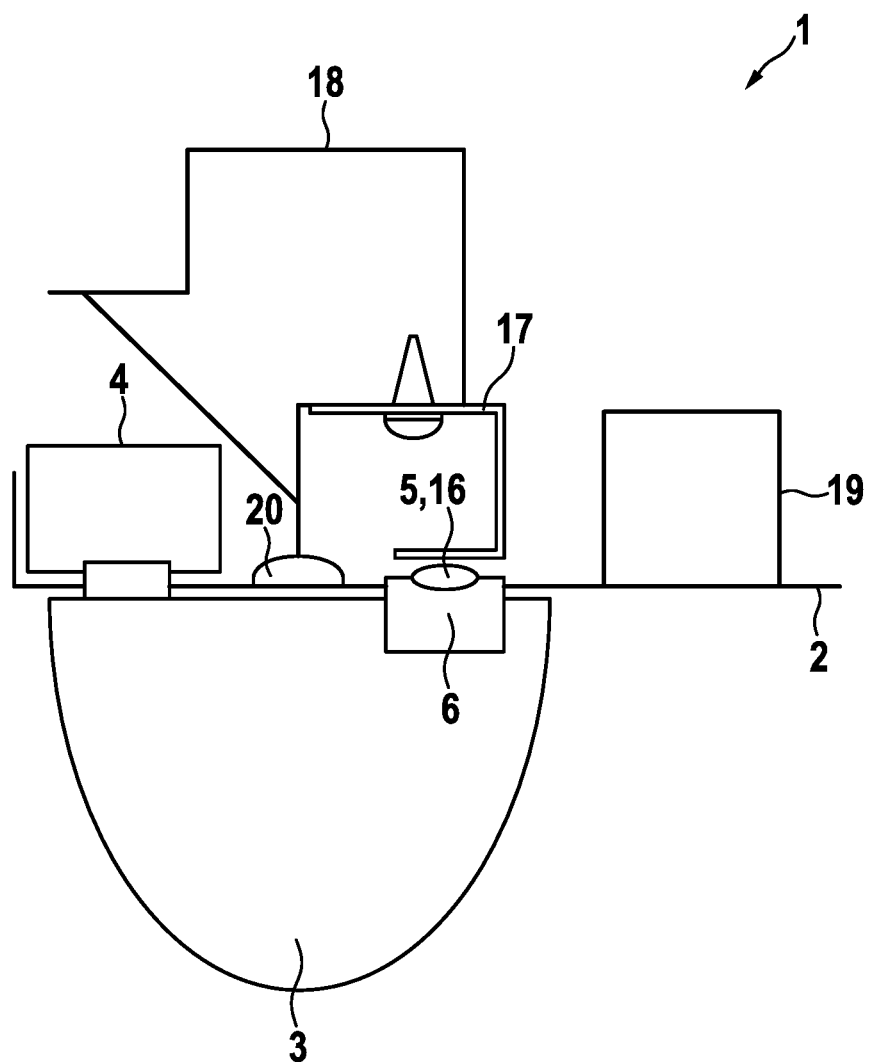

A detailed view of a horizontal cross-section in the area of one of the two door handles 3 is shown in FIG. 4. Accordingly, the door handle 3 is mounted on an outer side of the switch cabinet door 2, with the door status sensor 6 extending through the door 2 at least with its magnetic field sensor 5 or a reed switch 16 in order to determine a relative approach of the door status sensor 6 to the sensor counterpart 17 on the inner side of the switch cabinet 1. In particular, the sensor counterpart 17 is mounted on a profile side of the switch cabinet frame 18 facing the switch cabinet opening closed by the door element 2 and offset rearwardly with respect thereto. Furthermore, a door tube frame 19 is arranged on the inside of the door.

A door latch 4 mechanism, which also extends on the inside of the door, is arranged above the door handle 3, for example a push-rod latch which can be adjusted in the vertical direction. Via a sealing element 20, the door 2 is sealed on the inside with respect to the frame 18 in its closed position. In particular, if the magnetic field sensor 5 of the door status sensor 6 is designed as or has a reed contact, the use of a sensor counterpart 17 may be expedient.

However, the invention is not limited to embodiments in which the door opening status is determined by detecting a sensor counterpart 17. In particular, the invention is also intended to encompass those embodiments in which the door status sensor, in particular the magnetic field sensor 5 of the door status sensor 6, is used as a reference for determining the door status, and the determination of the door status sensor is based substantially on the detection of a change in the measured earth magnetic field. It is understandable that the latter embodiments, which make reference to the earth's magnetic field, are only appropriate for statically installed switch cabinets and therefore cannot be used in particular for applications in means of transport such as trains or ships.

The features of the invention disclosed in the foregoing description, in the drawing as well as in the claims may be essential for the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch cabinet comprising a switch cabinet door which closes the switch cabinet and has a door lock which can be actuated via a door handle, the switch cabinet door having a door status sensor which has a magnetic field sensor being adapted to distinguish an open state of the switch cabinet door from a closed state of the switch cabinet door by means of a detected geomagnetic field change, wherein at least the magnetic field sensor of the door status sensor is accommodated in a region of the door handle within the door handle which is magnetically permeable to the environment of the switch cabinet and is coupled to the geomagnetic field via the magnetically permeable region, wherein the door handle has a ferromagnetic base, via which the door handle is placed on an outer side of the switch cabinet door, and a cover, between which and the base the door status sensor is arranged, the cover having the magnetically permeable region and/or consisting entirely of a magnetically permeable material.

2. The switch cabinet according to claim 1, in which the door handle has a door handle body which consists of a ferromagnetic material and in which the door status sensor with the magnetic field sensor is accommodated, the door handle body having a receptacle which is closed off from the surroundings of the door handle via a magnetically permeable cover and in which at least the magnetic field sensor of the door status sensor is accommodated.

3. The switch cabinet according to claim 2, in which the door handle has a ferromagnetic pivoting lever which can be pivoted with respect to the switch cabinet door and which, in an open position pivoted away from the switch cabinet door, exposes a receptacle of the door handle, in which at least the magnetic field sensor of the door status sensor is accommodated, and covers the receptacle when the pivoting lever is in a closed position pivoted against the switch cabinet door.

4. The switch cabinet according to claim 1, in which the door handle is a radio handle for the contactless locking and/or unlocking of the door handle, for which purpose the door handle has a radio module arranged on a printed circuit board arranged inside the door handle, the door status sensor being arranged on the same printed circuit board as the radio module.

5. The switch cabinet according to claim 1, wherein the door status sensor further comprises a single- or multi-axis acceleration sensor arranged to transfer the magnetic field sensor from a deactivated stand-by mode to an activated mode for detecting a magnetic field change when an acceleration is detected.

6. The switch cabinet according to claim 1, wherein the magnetic field sensor comprises a reed switch.

7. The switch cabinet according to claim 1, in which the switch cabinet has a permanent magnet or a magnetizable sensor counterpart at a cabinet opening which can be closed by the switch cabinet door, wherein the magnetic field sensor is remote from the permanent magnet or the magnetizable sensor counterpart in an open position of the switch cabinet door and is proximate to the permanent magnet or the magnetizable sensor counterpart in a closed position of the switch cabinet door.

8. The switch cabinet according to claim 1, in which the magnetic field sensor comprises a Hall sensor and the switch cabinet comprises a magnetic or a magnetizable sensor counterpart, for example a switch cabinet frame, at a cabinet opening which can be closed by the switch cabinet door.

9. The switch cabinet according to claim 1, in which the switch cabinet has a light reflector at a cabinet opening which can be closed by the switch cabinet door, and the door status sensor is a light-sensitive sensor, for example a photoelement, which converts light into electrical energy when light falls on it.

* * * * *